US008745312B2

(12) United States Patent
Yun et al.

(10) Patent No.: US 8,745,312 B2
(45) Date of Patent: Jun. 3, 2014

(54) STORAGE DEVICE AND METHOD OF MAPPING A NONVOLATILE MEMORY BASED ON A MAP HISTORY

(75) Inventors: Eun-Jin Yun, Seoul (KR); Hye-Young Kim, Seoul (KR); Young-Joon Choi, Seongnam-si (KR); Dong-Gi Lee, Yongin-si (KR); Jin-Hyuk Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1390 days.

(21) Appl. No.: 12/071,498

(22) Filed: Feb. 21, 2008

(65) Prior Publication Data

US 2008/0209161 A1 Aug. 28, 2008

(30) Foreign Application Priority Data

Feb. 22, 2007 (KR) .................. 10-2007-0017769

(51) Int. Cl.
  *G06F 12/06* (2006.01)
(52) U.S. Cl.
  USPC ............... 711/103; 711/5; 711/140; 711/147; 711/169
(58) Field of Classification Search
  None
  See application file for complete search history.

(56) References Cited

U.S. PATENT DOCUMENTS

| 6,845,438 | B1 | 1/2005 | Tanaka et al. | |
|---|---|---|---|---|
| 7,191,306 | B2 | 3/2007 | Myoung et al. | |
| 2007/0083698 | A1* | 4/2007 | Gonzalez et al. | 711/103 |
| 2007/0186065 | A1* | 8/2007 | Lee et al. | 711/159 |
| 2008/0183949 | A1* | 7/2008 | Ly et al. | 711/103 |
| 2008/0189473 | A1* | 8/2008 | Murray | 711/103 |
| 2008/0201518 | A1* | 8/2008 | Kim et al. | 711/103 |
| 2008/0276036 | A1* | 11/2008 | Van Acht et al. | 711/103 |

FOREIGN PATENT DOCUMENTS

| JP | 10-124384 | 5/1998 |
|---|---|---|
| KR | 10-2004-0042478 A | 5/2004 |
| KR | 10-2004-0072875 A | 8/2004 |

OTHER PUBLICATIONS

Jesung Kim; Jong Min Kim; Noh, S.H.; Sang Lyul Min; Yookun Cho; , "A space-efficient flash translation layer for CompactFlash systems," Consumer Electronics, IEEE Transactions on , vol. 48, No. 2, pp. 366-375, May 2002.*
Jeong-Uk Kang, Heeseung Jo, Jin-Soo Kim, and Joonwon Lee. 2006. A superblock-based flash translation layer for NAND flash memory. In Proceedings of the 6th ACM \& IEEE International conference on Embedded software (EMSOFT '06). ACM, New York, NY, USA, 161-170.*

* cited by examiner

*Primary Examiner* — Matthew Bradley
*Assistant Examiner* — Ramon A Mercado
(74) *Attorney, Agent, or Firm* — Lee & Morse, P.C.

(57) ABSTRACT

A non-volatile memory may include a plurality of map blocks for storing a plurality of map units, the map units representing mapping information between physical addresses and logical addresses. A storage device may include such a non-volatile memory. A method of mapping such a non-volatile memory may include writing historical information regarding locations of valid map units among the map units included in map blocks previously allocated among the map blocks when a new map block among the map blocks is allocated, the valid map units representing valid mapping information, and constructing a map table including all of the valid mapping information based on the historical information and a result of searching a map block recently allocated among the map blocks.

21 Claims, 5 Drawing Sheets

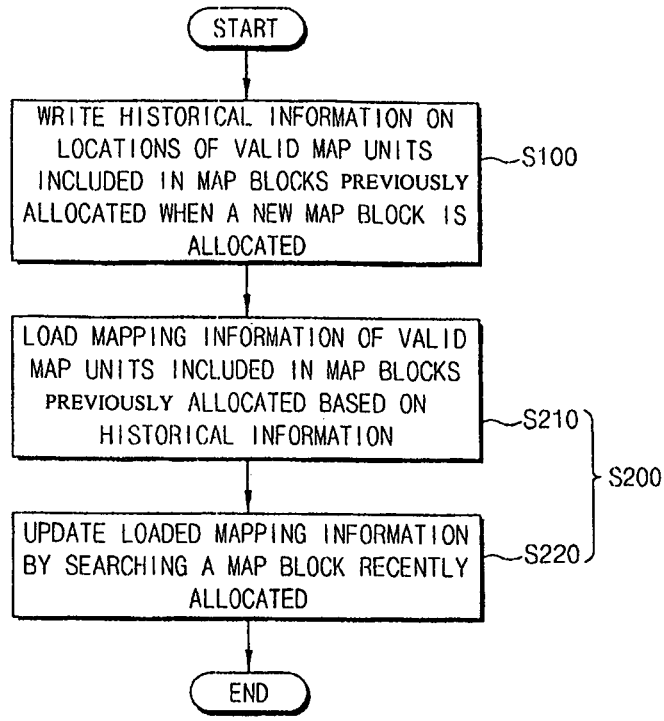
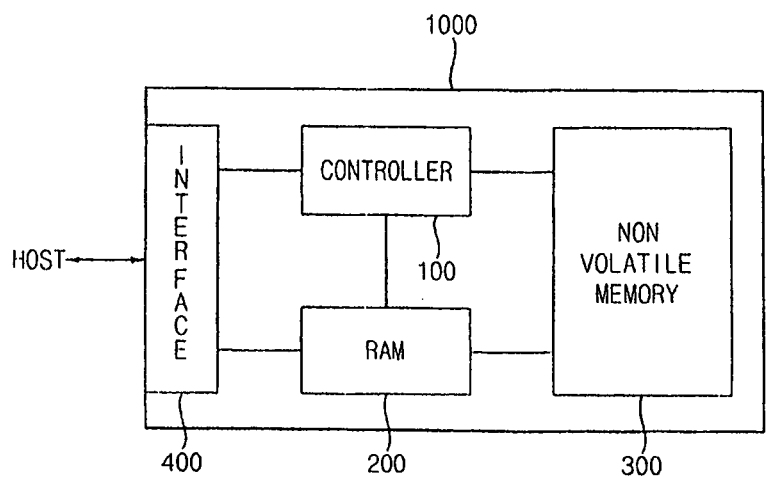

STORAGE DEVICE AND METHOD OF MAPPING A NONVOLATILE MEMORY BASED ON A MAP HISTORY

BACKGROUND OF THE INVENTION

1. Field of the Invention

Embodiments of the invention relate to a nonvolatile memory. More particularly, embodiments of the invention relate to a method of mapping a nonvolatile memory based on a map history and a storage device of performing the method.

2. Description of the Related Art

Semiconductor memories may be generally divided into volatile memories and non-volatile memories. Volatile memories, e.g., a dynamic random access memory (DRAM) and a static random access memory (SRAM), lose data stored therein when power is turned off. Non-volatile memories keep stored data over time, even when power is turned off. An electrically erasable programmable read only memory (EEPROM) capable of electrically writing/reading data has been widely developed as a non-volatile memory.

Operation modes of EEPROMs may be divided into a write mode or a program mode, during which a threshold voltage of a memory cell is programmed, a read mode during which data stored in the memory cell is read out and an erase mode during which the memory cell is initialized by erasing the stored data.

A flash memory may be an advanced type device of the EEPROM. The flash memory performs an erase operation by block units and performs a program operation by page units. Each page includes all or a portion of memory cells commonly coupled to a word line. Flash memories may be classified as a NAND type flash memory or a NOR type flash memory based on an arrangement of a memory cell array. NAND type flash memories may include cell transistors that are connected in series between a bit line and a ground line. NOR type flash memories may include cell transistors that are connected in parallel between the bit line and the ground line. NAND type flash memories cannot access the memory cell array in byte units during a read operation or a program operation. However, the NAND type flash memory may more rapidly program and more rapidly erase the memory cell array.

A non-volatile memory performs an erase operation and an access operation (that is, a write operation and a read operation) based on different units. The non-volatile memory has a limitation such that the non-volatile memory cannot perform the erase operation or the write operation above a predetermined number of times. To overcome such a limitation on the number of the operations, an intermediate process is employed to efficiently map logical addresses, which are generated by a file system of a host such as a personal computer, to physical addresses of the non-volatile memory. For example, a flash translation layer (FTL) implemented as an intermediary may be coupled between a host using a file system for a hard disk and a flash memory for efficiently mapping the logical addresses to the physical addresses.

However, mapping information between the logical addresses and the physical addresses may be scattered in the non-volatile memory. The scattered mapping information may be implemented as a map table during initialization of the non-volatile memory to increase an access speed of the non-volatile memory.

Since valid map units are scattered over map blocks, all of used map blocks must be fully scanned in sequence to update a map table by identifying locations of currently valid map units. During a map opening operation (that is, when the map table is constructed while a memory is initialized), the used and recently allocated map blocks are read in order to construct the map table.

For example, if the non-volatile memory includes m used map blocks and one recently allocated map block, where each of the map blocks has n pages and a scan time is tR per page, a time period for constructing the map table is $(m+1)*n*tR$.

Since valid map units are searched by scanning all of the used map blocks to construct the map table, a search time for constructing the map block increases as the used map blocks increases. As a density of a memory device increases, the number of the map blocks included in the non-volatile memory increases and the number of pages included in each of the map blocks increases. Accordingly, a map open time increases considerably.

Therefore, a storage device including such a non-volatile memory has a long initialization time because of increased time for constructing the map table when a number of map blocks exist. Such an increase in the initialization time may deteriorate performances of the storage device and a system including the storage device. In this case, some regular requirements, such as a host open time specification, may not be satisfied.

SUMMARY OF THE INVENTION

Embodiments of the present invention are therefore directed to a storage device and a method of mapping a nonvolatile memory based on a map history, which substantially overcome one or more of the problems due to the limitations and disadvantages of the related art.

It is therefore a feature of an embodiment of the invention to provide a method of mapping a non-volatile memory that is capable of reducing a map opening time.

It is therefore a separate feature of an embodiment of the invention to provide a storage device including a non-volatile memory that is capable of reducing a map opening time.

At least one of the above and other features and advantages of the present invention may be realized by providing a method of mapping a non-volatile memory including a plurality of map blocks for storing a plurality of map units, the map units representing mapping information between physical addresses and logical addresses, the method including writing historical information regarding locations of valid map units among the map units included in map blocks previously allocated among the map blocks when a new map block among the map blocks is allocated, the valid map units representing valid mapping information, and constructing a map table including all of the valid mapping information based on the historical information and a result of searching a map block recently allocated among the map blocks.

Constructing the map table may include loading the valid mapping information of the valid map units included in the map blocks previously allocated into a random access memory based on the historical information, and updating the loaded mapping information by searching the map block recently allocated.

Loading the valid mapping information may include determining recent historical information among a plurality of historical information written during allocation of at least one of the map blocks previously allocated and the map block recently allocated, and loading the valid mapping information stored at the valid map units, wherein the locations of the valid map units are included in the recent historical information.

The historical information may include the physical addresses of the valid map units included in the map blocks previously allocated and a serial number representing an order when the historical information is written.

Writing the historical information may include determining whether allocating the new map block is necessary if allocating a new map unit is necessary, allocating one of unused map blocks among the map blocks if allocating the new map block is necessary, and writing the physical addresses of the valid map units included in the map blocks previously allocated as the historical information.

Determining whether allocating the new map block is necessary may include determining whether a space for writing the new map unit exists in the map block recently allocated before the new map unit is written to the map block recently allocated. Determining whether allocating the new map block is necessary may include determining whether a space for writing a map unit to be written next time exists in the map block recently allocated after the new map unit is written to the map block recently allocated.

Writing the historical information may include writing the physical addresses of the valid map units included in the map blocks previously allocated to the allocated new map block. Writing the historical information may further include writing a serial number to the historical information, the serial number representing an order when the historical information is written. Each of the map blocks included in the non-volatile memory may include a plurality of pages which are units of a write operation and a read operation, and wherein the historical information may be written to a first page of the allocated new map block.

The non-volatile memory may include a map area including the plurality of map blocks, a data area adapted to store data and a management area adapted to store information for controlling the map area and the data area, and wherein writing the historical information may include writing the physical addresses of the valid map units included in the map blocks previously allocated to the management area.

Writing the historical information may include storing valid map unit address information including the physical addresses of all valid map units included in the map blocks previously allocated and the map block recently allocated in a random access memory, updating the valid map unit address information stored in the random access memory if a new map unit is written, and writing the historical information based on the physical addresses included in the valid map unit address information stored in the random access memory when the new map block is allocated. The non-volatile memory may be a flash memory.

At least one of the above and other features and advantages of the present invention may be separately realized by providing a storage device, including a non-volatile memory including a plurality of map blocks adapted to store a plurality of map units, the map units representing mapping information between physical addresses and logical addresses, the non-volatile memory configured to store historical information on locations of valid map units among the map units included in map blocks previously allocated among the map blocks, the valid map units representing valid mapping information, a memory controller configured to write the historical information when a new map block among the map blocks is allocated and configured to construct a map table including all of the valid mapping information based on the historical information and a result of searching a map block recently allocated among the map blocks, a random access memory configured to store the constructed map table.

The historical information may include the physical addresses of the valid map units included in the map blocks previously allocated and a serial number representing an order when the historical information is written. The allocated new map block may include a portion to which the historical information is written. Each of the map blocks included in the non-volatile memory may include a plurality of pages which are units of a write operation and a read operation, and wherein the historical information may be written to a first page of the allocated new map block.

The non-volatile memory may include a map area including the plurality of map blocks, a data area for storing data and a management area storing information for controlling the map area and the data area, and wherein the historical information is written to the management area.

The memory controller may be configured to store valid map unit address information including the physical addresses of all valid map units included in the map blocks previously allocated and the map block recently allocated in a random access memory, configured to update the valid map unit address information stored in the random access memory if a new map unit is allocated, and configured to write the historical information based on the physical addresses included in the valid map unit address information stored in the random access memory when the new map block is allocated. The non-volatile memory may be a flash memory. The storage device may be one of a solid state disk (SSD) and compact flash disk.

BRIEF DESCRIPTION OF THE DRAWINGS

The above and other features and advantages of the present invention will become more apparent to those of ordinary skill in the art by describing in detail exemplary embodiments thereof with reference to the attached drawings, in which:

FIG. 1 illustrates a flow chart of a method of mapping a non-volatile memory according to an exemplary embodiment of the present invention;

FIG. 2 illustrates a block diagram of a storage device according to an exemplary embodiment of the invention;

DETAILED DESCRIPTION OF THE INVENTION

Figure 3:
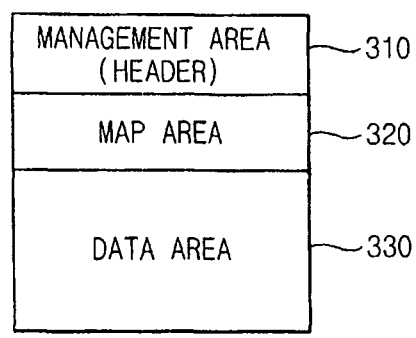
FIG. 3 illustrates a diagram of an exemplary non-volatile memory employable by the storage device of FIG. 2.

Korean Patent Application No. 2007-17769, filed on Feb. 22, 2007, in the Korean Intellectual Property Office, and entitled: "Method and Storage Device of Mapping a Nonvolatile Memory Based on a Map History," is incorporated by reference herein in its entirety.

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, and/or components thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a flow chart of a method of mapping a non-volatile memory according to an exemplary embodiment of the present invention. Before describing the exemplary method in accordance with an embodiment in detail, a brief overview of a non-volatile memory and a plurality of map blocks that may be used with the method with be set forth.

Figure 5:
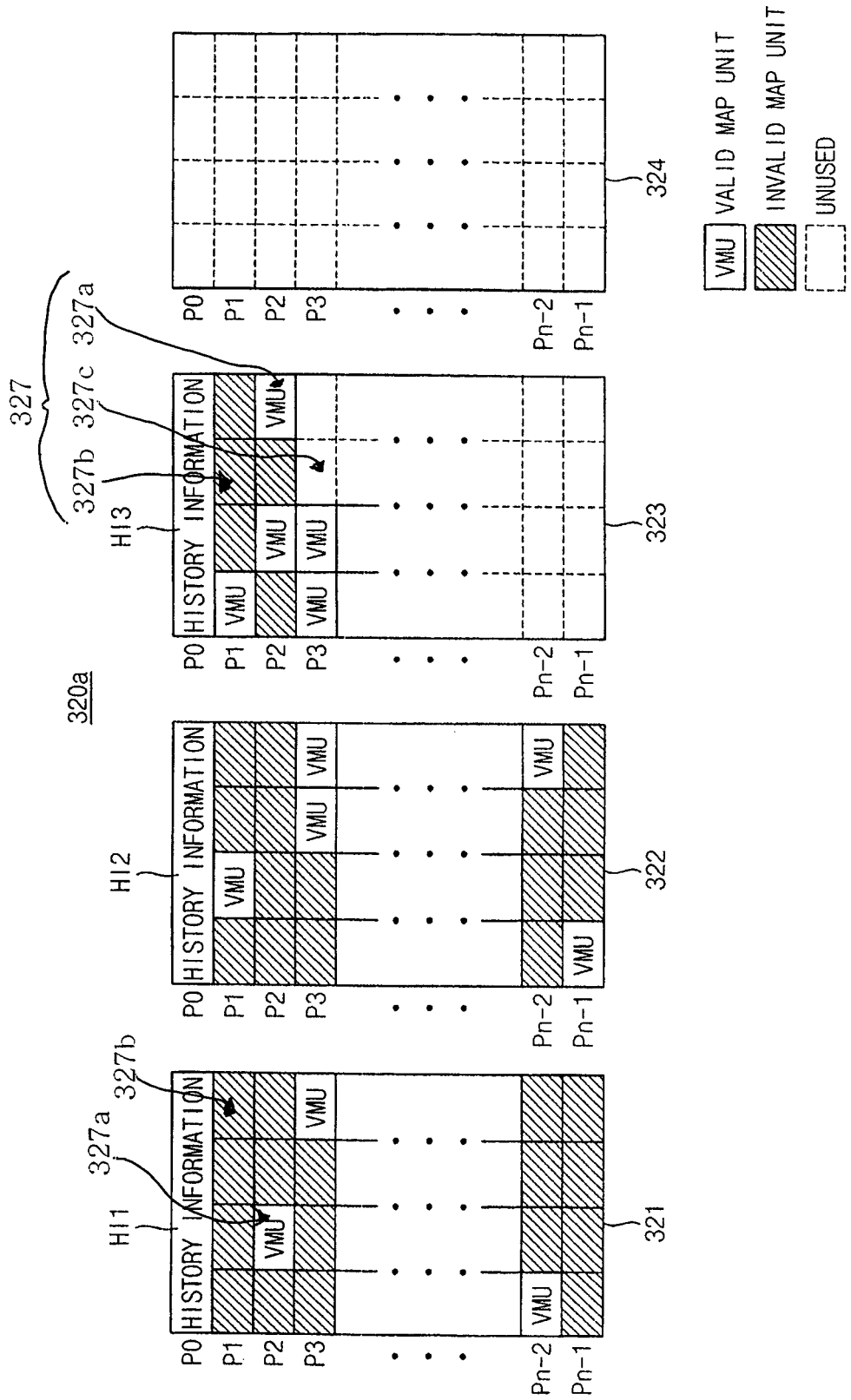
FIG. 5 illustrates a diagram of an exemplary map area that may be included in the non-volatile memory of FIG. 3.

A non-volatile memory (e.g., 300 in FIG. 3) may include a map area (e.g., 320a in FIG. 5) including a plurality of map blocks (e.g., 321, 322, 323, 324 in FIG. 5). The map blocks may store mapping information. Each map block may include a plurality of pages (e.g., P0 to Pn-1 in FIG. 5). For example, a size of each of the pages may be, e.g., 2048 bytes, and each map block may include, e.g., 64 pages. Each of the pages may include a plurality of map units (e.g., 327 in FIG. 5). For example, each page may include four map units, and if each page has a size of 2048 bytes, each map unit may have a size of 512 bytes.

Mapping information between logical addresses and physical addresses may be divided into the map units and may be managed by the respective map unit. If the mapping information of a specific map unit is updated by an erase operation, then a previous map unit is disused and a map unit including valid mapping information is written. The map unit including the valid mapping information, which is updated recently, may be referred to as a valid map unit (e.g., 327a in FIG. 5). The map unit including invalid mapping information, i.e., not updated information, may be referred to as a disused map unit or an invalid map unit (e.g., 327b in FIG. 5). A map unit of the recently allocated map block that is yet to be written may be referred to as an unused map unit (e.g., 327c in FIG. 5). If a map block is fully used, then an unused map block is allocated so as to write map units updated recently.

Referring back to FIG. 1, when a new map block is allocated, historical information (see FIG. 6) may be written (step S100). The historical information may include locations of valid map units VMUs (327a) representing valid mapping information among the map units included in the map blocks previously allocated.

A map table including whole mapping information may be constructed by searching the map block recently allocated based on the written historical information (step S200). The map block recently allocated means a map block that is currently used, where a new map unit is written if the mapping information is modified. As compared with the map block recently allocated, the map blocks previously allocated means used map blocks except the map block recently allocated.

For example, in order to construct the map table (step S200), the mapping information of the valid map units included in the map blocks previously allocated may be loaded into a random access memory (RAM) based on the written historical information (step S210). The loaded mapping information may be updated by searching the map block recently allocated (step S220).

Loading the mapping information of the valid map units included in the map blocks previously allocated into the RAM may be embodied in various forms. In some embodiments, e.g., recent historical information may be determined among a plurality of historical information that is written when the map blocks are allocated, respectively. Thus, the mapping information stored at locations of the valid map units included in the recent historical information may be loaded.

Hereinafter, a storage device according to an exemplary embodiment of the present invention will be described, and the exemplary method of mapping non-volatile memory of FIG. 1 will be described in detail in relation to writing the historical information (step S100).

FIG. 2 illustrates a block diagram of a storage device 1000 according to an exemplary embodiment of the invention.

Referring to FIG. 2, the storage device 1000 may include a memory controller 100, a random access memory (RAM) 200 and the non-volatile memory 300. The storage device 1000 may further include an interface 400 for connecting the storage device 1000 to a host.

The non-volatile memory 300 may include a plurality of map blocks. A plurality of map units representing mapping information between physical addresses and logical addresses may be written to each of the map units. If a map block has no space for writing a new map unit, a new map block among unused map blocks may be allocated.

Historical information may be written to the non-volatile memory 300. The historical information may be written whenever the new map block is allocated. The historical information may include locations of valid map units representing valid mapping information among the map units included in the map blocks previously allocated.

The memory controller 100 may control overall operations of the storage device 1000. For example, the memory controller 100 may write the historical information when a new map block is allocated, and may construct a map table by searching the map block recently allocated based on the historical information.

The map table constructed during a map opening operation may be stored in the RAM 200. The map table stored in the RAM 200 may be updated when the mapping information is modified by writing the new map unit(s). The RAM 200 may be implemented as a memory that can be rapidly accessed in units of a byte, such as a SRAM, a DRAM, etc.

The storage device 1000 may be a storage medium, such as a solid state disk (SSD), a compact flash card, etc. The memory controller 100 and the RAM 200 included in the storage device 1000, as well as the non-volatile memory 300, may be implemented together with the storage device, as illustrated in FIG. 2. Alternatively, the memory controller 100 and the RAM 200 may be included in a different device(s) separate from the storage device 1000, such as a card reader. The memory controller 100 may perform other functions as well as functions for controlling the non-volatile memory 300.

The RAM 200 may have a buffer space for storing write data received from a host or read data received from a non-volatile memory. In the RAM 200, valid map unit address information, which may include physical addresses of all valid map units included in map blocks previously and recently allocated, may be stored. The valid map unit address information will be described below.

FIG. 3 illustrates a diagram of the exemplary non-volatile memory 300 employable by the storage device 1000 of FIG. 2.

Referring to FIG. 3, the non-volatile memory 300 may include a management area 310, a map area 320 and a data area 330.

The map area 320 may include a plurality of map blocks. The data area 330 may include a plurality of data blocks for storing data. Memory blocks included in the non-volatile memory 300, such as the map blocks, the data blocks, etc., may have the same physical configuration. For example, a flash memory may have a plurality of the memory blocks having the same physical configuration, which are divided into management block(s), map block(s) and data block(s) according to which area of the non-volatile memory 300 the respective memory block belongs. The memory blocks may be related to physical addresses successively assigned, respectively.

Information for managing the map area 320 and the data area 330 may be written to the management area or a header 310. The management area 310 may include, e.g., overall information, such the type of the non-volatile memory 300, information on memory capacity, information on bad memory blocks, information on allocated map blocks, etc.

Figure 4:
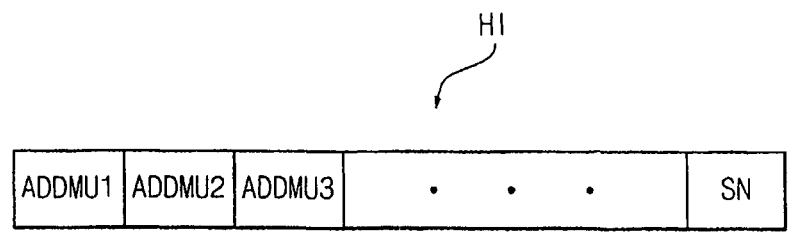
FIG. 4 illustrates a diagram of exemplary historical information that may be included in the non-volatile memory of FIG. 3.

FIG. 4 illustrates a diagram of exemplary historical information H1 that may be included in the non-volatile memory 300 of FIG. 3.

Referring to FIG. 4, the historical information HI may include, e.g., physical addresses ADDMU1, ADDMU2 and ADDMU3 of valid map units (e.g., 327a of FIG. 5) included in map blocks (e.g., 321, 322 of FIG. 5) previously allocated and/or a serial number SN representing an order when the historical information HI is written.

The historical information HI may be written when a new map block is allocated. A map block recently allocated may be determined based on the serial number SN representing the order.

For example, the physical addresses ADDMU1, ADDMU2 and ADDMU3 of the valid map units, which are included in the historical information HI, represent locations of the valid map units, respectively. The physical addresses ADDMU1, ADDMU2 and ADDMU3 may include addresses of blocks and pages included in the blocks. In embodiments in which a plurality of map units are written to each page, the physical addresses ADDMU1, ADDMU2 and ADDMU3 of the valid map units may further include locations of the valid map units in relation to the pages, respectively.

FIG. 5 illustrates a diagram of an exemplary map area 320a that may be included in the non-volatile memory 300 of FIG. 3.

Referring to FIG. 5, the map area 320a may include a plurality of map blocks 321, 322, 323 and 324 for storing mapping information. In FIG. 5, first through fourth map blocks 321, 322, 323 and 324 are illustrated. Embodiments of the invention are not limited thereto. For example, the map area 320a may include more than or less than four map blocks. The number of map blocks in the map area 320a may be based on a capacity of the non-volatile memory 300. In the exemplary embodiment illustrated in FIG. 5, the first and the second map blocks 321 and 322 may be previously allocated map blocks, the third map block 323 may be a map block recently allocated and currently being used, and the fourth map block 324 may be an unused map block that may be allocated as a new map block if an unused space of the third map block 323 for storing map units is fully exhausted.

The map units including valid mapping information are referred to as valid map units VMU 327a, which are recently updated and are different from invalid map units 327b that are disused as a result of modifications to the mapping information.

The mapping information between logical addresses and physical addresses may be divided into map units and managed in units of the map units. As illustrated in FIG. 5, each of the map blocks 321, 322, 323 and 324 may include n pages P0 through Pn-1, which may be units of a write operation and a read operation. Each of the pages P0 through Pn-1 may include a plurality of the map units. The number of the map units included in one page may be changed according to the number of memory blocks corresponding to one map unit and/or a format of the mapping information.

In the exemplary embodiment illustrated in FIG. 5, historical information HI1, HI2 and HI3 is written to the allocated map blocks 321, 322 and 323, respectively. In some embodiments, the historical informations HI1, HI2 and HI3 may be written to a first page HI1 of the allocated map blocks 321, 322 and 323, respectively. Embodiments are not limited thereto. For example, in some embodiments, historical information may be written to two or more pages of each of the map blocks.

In other embodiments, the historical information HI1, HI2 and HI3 may be included in the management area 310. In such embodiments, the historical information HI1, HI2 and HI3 may include physical addresses of map blocks corresponding to the historical information HI1, HI2 and HI3, respectively.

By using the historical information HI1, HI2 and HI3, a map opening time may be reduced since a map table may be constructed by searching only the map block recently allocated, e.g., map block 323 in FIG. 5. More particularly, when historical information is not available, each page of every used and recently allocated and currently used map block must be scanned during a map opening operation. Thus, assuming a non-volatile memory includes m used map blocks and one recently allocated and currently used map block, each of which has n pages, and a scan time is tR per page, a time period for constructing the map table is about (m+1)*n*tR.

Embodiments of the invention may enable a map opening time to be reduced by employing historical information, e.g., HI1, HI2 and HI3. In a method of mapping the non-volatile memory according to an exemplary embodiment of the invention, a time period for constructing a map table may be about (hm+n)*tR, i.e., a time for scanning each page containing historical information and a time for scanning all the pages of the recently allocated and currently used map block, where h is a number of pages of historical data in each of the map blocks and h may be a number greater than or equal to one and much less than n, i.e., 1<=h<<n. In some embodiments, not all the pages of the recently allocated and currently used map block may be scanned, i.e., scanning may be stopped when a page containing only unused map units 327c is determined. In some embodiments, the historical information of the recently allocated and currently used map blocks may include information regarding the valid map units included in the used map blocks previously allocated such that only the historical information of the recently allocated and currently used map block may be scanned and a corresponding map opening time may be further reduced. More particularly, in such embodiments a time period for constructing a map table may be about (n*tR), where only the n pages of the recently allocated and currently used map block, including historical information of all the used map blocks previously allocated, is scanned.

As discussed above, embodiments of the invention may employ historical information and reduce a necessary scan time of a map opening operation.

Accordingly, in embodiments, as the number of used map blocks increases, the map opening time may be considerably reduced as compared with known conventional methods.

Figure 6:
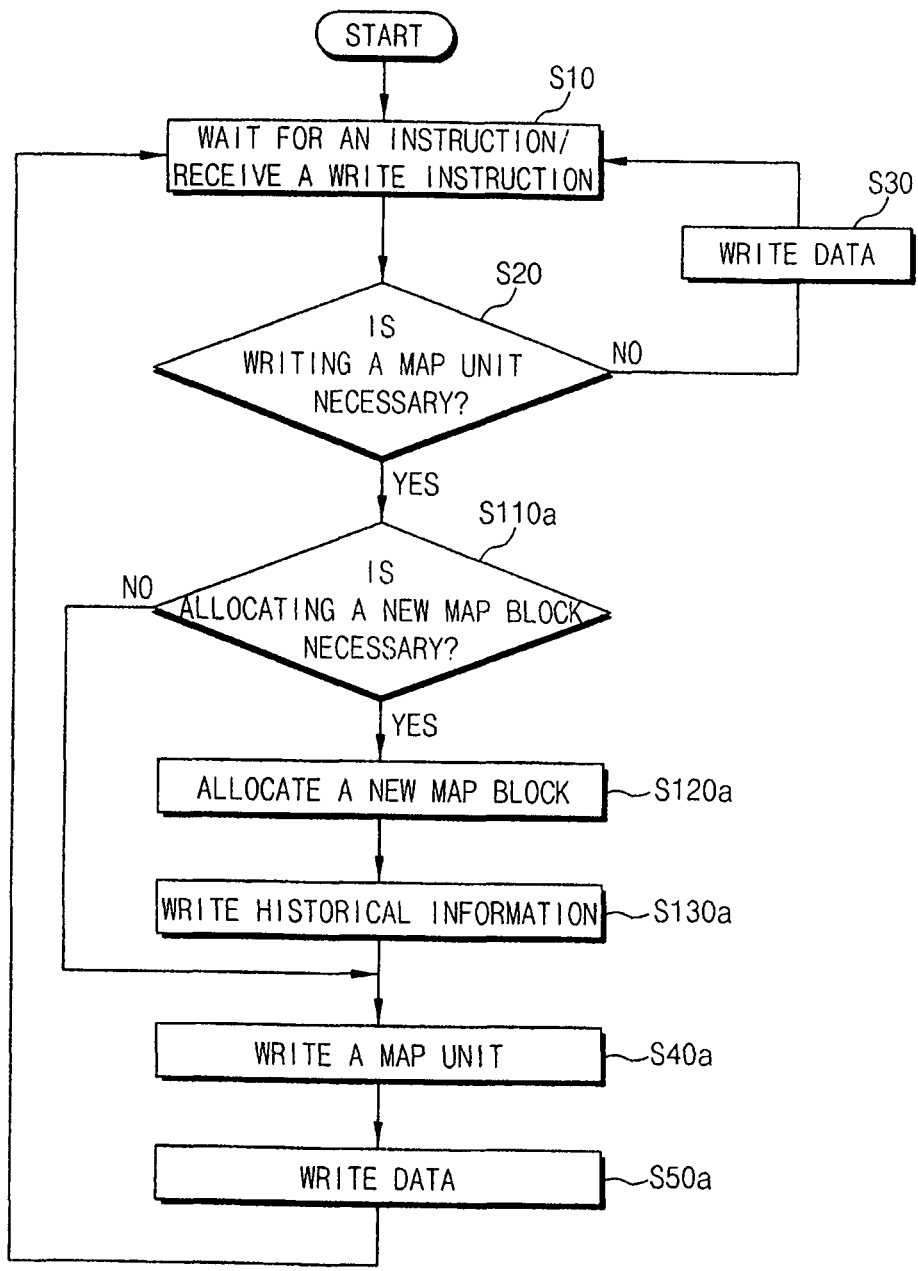
FIG. 6 illustrates a flow chart of an exemplary embodiment of a write operation including writing historical information in the storage device of FIG. 2.

FIG. 6 illustrates a flow chart of an exemplary embodiment of a write operation including writing historical information in the storage device of FIG. 2.

A write instruction may be received while the storage device 1000 of FIG. 2 waits for an instruction from a host (step S10). Whether writing a new map unit is necessary is determined by deciding whether data is written to a new physical address or whether the data is written to a previous physical address without modifications of physical addresses (step S20). If writing a new map unit is not necessary (step S20: NO), the data is written to the previous physical address (step S30), and then the storage device 1000 of FIG. 2 returns to a wait state (step S10).

If writing a new map unit is necessary (step S20: YES), whether allocating a new map block is necessary is determined (step S110a). If allocating the new map block is necessary (step S110a: YES), one map block of unused map blocks may be allocated to write the new map unit (step S120a). Physical addresses of valid map units included in the map blocks previously allocated (e.g., map blocks 321 and 322 of FIG. 5) may be written to the new map block (e.g., map block 323 of FIG. 5) as the historical information (step S130a).

As described above, according to some embodiments, the historical information may be written to the map block recently allocated as illustrated in FIG. 5, or may be written to the management area 310 as illustrated in FIG. 3.

The map unit is written to the new map block (step S40), and then the data is written to a corresponding physical address (step S50). If allocating the new map block is not necessary (step S110a: NO), the map unit is written to the map block recently allocated (step S40) without allocating the new map block (step S120a) and writing the historical information (step S130a).

In the exemplary embodiment illustrated in FIG. 6, whether a space for writing the new map unit exists in the map block recently allocated may be determined before the new map unit is written to the map block recently allocated. However, embodiments of the invention are not limited thereto.

Figure 7:
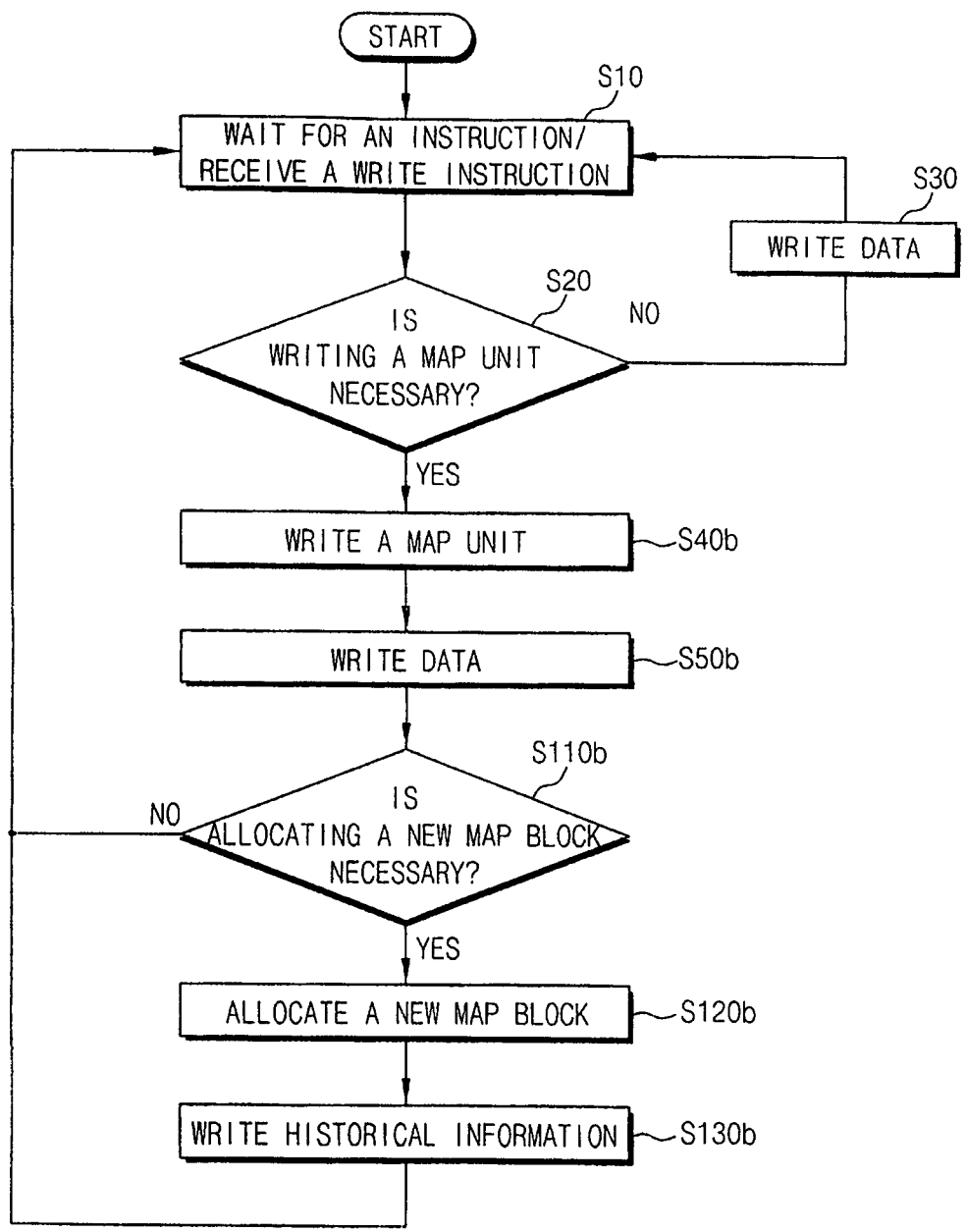
FIG. 7 illustrates a flow chart of another exemplary embodiment of a write operation including writing historical information in the storage device of FIG. 2.

FIG. 7 illustrates a flow chart of another exemplary embodiment of a write operation including writing historical information in the storage device 1000 of FIG. 2. In general, only differences between the exemplary embodiment illustrated in FIG. 6 and the exemplary embodiment illustrated in FIG. 7 will be described below.

In the exemplary embodiment illustrated in FIG. 7, in contrast to the exemplary embodiment illustrated in FIG. 6, whether a space for writing a map unit to be written next time exists in a map block recently allocated may be determined after a new map unit is written to the map block recently allocated.

Referring to FIG. 7, if writing the new map unit is necessary (step S20: YES), the new map unit may be written to the map block recently allocated (step S40b), and then data may be written to a corresponding physical address (step S50b). After writing the new map unit and writing the data are completed, whether allocating a new map block is necessary may be determined (step S110b). If allocating a new map block is necessary (step S110b: YES), one map block of unused map blocks may be allocated to write the new map unit (step S120b). Physical addresses of valid map units included in map blocks previously allocated may be written to the new map block as historical information (step S130b), and then the storage device 1000 of FIG. 2 may return to a wait state (step S10). If allocating a new map block is not necessary (step S110b: NO), the storage device 1000 of FIG. 2 may return to the wait state (step S10) without allocating the new map block (step S120b) and writing the historical information (step S130b).

In the exemplary embodiment illustrated in FIG. 7, if the map block recently allocated has no space for writing the new map, a new map block for writing the map unit to be written next time may be allocated in advance.

Referring again to FIG. 2, the RAM 200 may store valid map unit address information as well as a map table when the map table is constructed. The valid map unit address information may include physical addresses of all valid map units included in map blocks previously allocated and a map block recently allocated. The valid map unit address information may be updated whenever a new map unit is written. If the physical addresses of all the valid map units are stored in the RAM 200 that may be accessed easily and rapidly, historical information may be written rapidly. That is, in such embodiments, searching the map block recently allocated as well as the map blocks previously allocated may not be required to write the historical information. Thus, the historical information may be written rapidly based on the physical addresses of all the valid map units, which are included in the valid map unit address information.

In the description above, subject matter and exemplary embodiments of the present invention are described with reference to a flash memory that performs an erase operation by block units and performs a write operation and a read operation by page units. A non-volatile memory included in a storage device, however, is not limited to the flash memory. Aspects of the present invention may be applied to all kinds of non-volatile memories requiring a mapping between logical addresses and physical addresses to interface with a file system of a host.

As described above, methods of mapping a non-volatile memory and a storage device according to embodiments of the invention may reduce a map opening time by constructing a map table based on a map history, such as historical information. Accordingly, performances of a storage device including the non-volatile memory and a system including the storage device may be enhanced.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of mapping a non-volatile memory including a plurality of map blocks, each map block including a plurality of pages and each page including a plurality of map units, the map units representing mapping information between physical addresses and logical addresses, the method comprising:
   when a new map block among the map blocks is allocated, writing historical information in the allocated new map block or in a management area in a different location, the historical information representing locations of valid map units among the map units included in pages in map blocks previously allocated among the map blocks and omitting information of unused or invalid map units, the valid map units representing valid mapping information; and
   constructing a map table to be stored in a memory by scanning the historical information and information in only one predetermined block, the map table including all of the valid mapping information based on the historical information and the predetermined block is a map block recently allocated among the map blocks.

2. The method as claimed in claim 1, wherein constructing the map table comprises:
   loading the valid mapping information of the valid map units included in the map blocks previously allocated into the memory based on the historical information; and
   updating the loaded mapping information by searching the map block recently allocated.

3. The method as claimed in claim 2, wherein loading the valid mapping information comprises:
   determining recent historical information among a plurality of historical information written during allocation of at least one of the map blocks previously allocated and the map block recently allocated; and
   loading the valid mapping information stored at the valid map units, wherein the locations of the valid map units are included in the recent historical information.

4. The method as claimed in claim 1, wherein the historical information includes the physical addresses of the valid map units included in the map blocks previously allocated and a serial number representing an order when the historical information is written.

5. The method as claimed in claim 1, wherein writing the historical information comprises:
   determining whether allocating the new map block is necessary if allocating a new map unit is necessary;
   allocating one of unused map blocks among the map blocks if allocating the new map block is necessary; and
   writing the physical addresses of the valid map units included in the map blocks previously allocated as the historical information.

6. The method as claimed in claim 5, wherein determining whether allocating the new map block is necessary comprises determining whether a space for writing the new map unit exists in the map block recently allocated before the new map unit is written to the map block recently allocated.

7. The method as claimed in claim 5, wherein determining whether allocating the new map block is necessary comprises determining whether a space for writing a map unit to be written next time exists in the map block recently allocated after the new map unit is written to the map block recently allocated.

8. The method as claimed in claim 1, wherein writing the historical information includes writing the physical addresses of the valid map units included in the map blocks previously allocated in the allocated new map block.

9. The method as claimed in claim 8, wherein writing the historical information further includes writing a serial number to the historical information, the serial number representing an order when the historical information is written.

10. The method as claimed in claim 8, wherein the plurality of pages are units of a write operation and a read operation, and wherein the historical information is written in a first page of the allocated new map block.

11. The method as claimed in claim 1, wherein the non-volatile memory includes a map area including the plurality of map blocks, a data area adapted to store data and the management area adapted to store information for controlling the map area and the data area.

12. The method as claimed in claim 1, wherein writing the historical information comprises:
   storing valid map unit address information including the physical addresses of all valid map units included in the map blocks previously allocated and the map block recently allocated in the memory;
   updating the valid map unit address information stored in the memory if a new map unit is written; and
   writing the historical information based on the physical addresses included in the valid map unit address information stored in the random access memory when the new map block is allocated.

13. The method as claimed in claim 1, wherein the non-volatile memory is a flash memory.

14. A storage device, comprising:
   a non-volatile memory including a plurality of map blocks, each map block including a plurality of pages and each pages including a plurality of map units, the map units representing mapping information between physical addresses and logical addresses, the non-volatile memory configured to store historical information in each of allocated map blocks among the plurality of map blocks or in a management area in a different location, the historical information representing locations of valid map units among the map units included in pages in map blocks previously allocated among the map blocks and omitting information of unused or invalid map units, the valid map units representing valid mapping information;
   a memory controller configured to, when a new map block among the map blocks is allocated, write the historical information in the allocated new map block or the management area and configured to construct a map table by scanning the historical information and information in only one predetermined block, the map table including all of the valid mapping information based on the historical information and the predetermined block is a map block recently allocated among the map blocks; and
   a memory configured to store the constructed map table.

15. The storage device as claimed in claim 14, wherein the historical information includes the physical addresses of the valid map units included in the map blocks previously allocated and a serial number representing an order when the historical information is written.

16. The storage device as claimed in claim 14, wherein the allocated new map block includes a portion to which the historical information is written.

17. The storage device as claimed in claim 16, wherein the plurality of pages are units of a write operation and a read operation, and wherein the historical information is written in a first page of the allocated new map block.

18. The storage device as claimed in claim 14, wherein the non-volatile memory includes a map area including the plurality of map blocks, a data area for storing data and a management area storing information for controlling the map area and the data area.

19. The storage device as claimed in claim 14, wherein the memory controller is configured to store valid map unit address information including the physical addresses of all valid map units included in the map blocks previously allocated and the map block recently allocated in the memory, configured to update the valid map unit address information stored in the memory if a new map unit is allocated, and configured to write the historical information in the allocated new map block based on the physical addresses included in the valid map unit address information stored in the memory.

20. The storage device as claimed in claim 14, wherein the non-volatile memory is a flash memory.

21. The storage device as claimed in claim 14, wherein the storage device is one of a solid state disk (SSD) and compact flash disk.

* * * * *